United States Patent [19]
Conner

[11] Patent Number: 6,032,407
[45] Date of Patent: Mar. 7, 2000

[54] COMBINATION AEROSOL GENERATOR AND THERMAL FOGGER

[75] Inventor: Larry D. Conner, Maple Grove, Minn.

[73] Assignee: Clarke Engineering Technologies, Inc., Roselle, Ill.

[21] Appl. No.: 09/178,679

[22] Filed: Oct. 19, 1998

[51] Int. Cl.$^7$ .................................................. A01M 13/00
[52] U.S. Cl. ............................................. 43/129; 43/125
[58] Field of Search ........................... 43/125, 126, 127, 43/128, 129, 130; 239/443, 444, 446, 447, 312

[56] References Cited

U.S. PATENT DOCUMENTS

| 3,239,960 | 3/1966 | Stevens | 43/129 |
| 3,244,641 | 4/1966 | Dur et al. | 43/129 |
| 3,255,967 | 6/1966 | Kenney | 43/125 |

Primary Examiner—Michael J. Carone
Assistant Examiner—Jeffrey L. Gellner
Attorney, Agent, or Firm—Dorn, McEachran, Jambor & Keating

[57] ABSTRACT

A combination ultra-low volume aerosol generator and thermal fogger for dispensing a mosquito killing insecticide includes a power source which may be a gasoline driven engine and an air pump connected to the power source. The air pump drives a turbine pump which has a rotatable turbine wheel. There is a fluid pump connected to and driven by rotation of the turbine wheel. An insecticide formulation tank is connected to the fluid pump and provides insecticide to an atomizing nozzle and a thermal fog muffler and fog discharge. There is a flow selector valve connected to the fluid pump to determine which discharge device receives fluid insecticide. There is a volume control valve connected between the fluid pump and the flow selector valve.

7 Claims, 2 Drawing Sheets

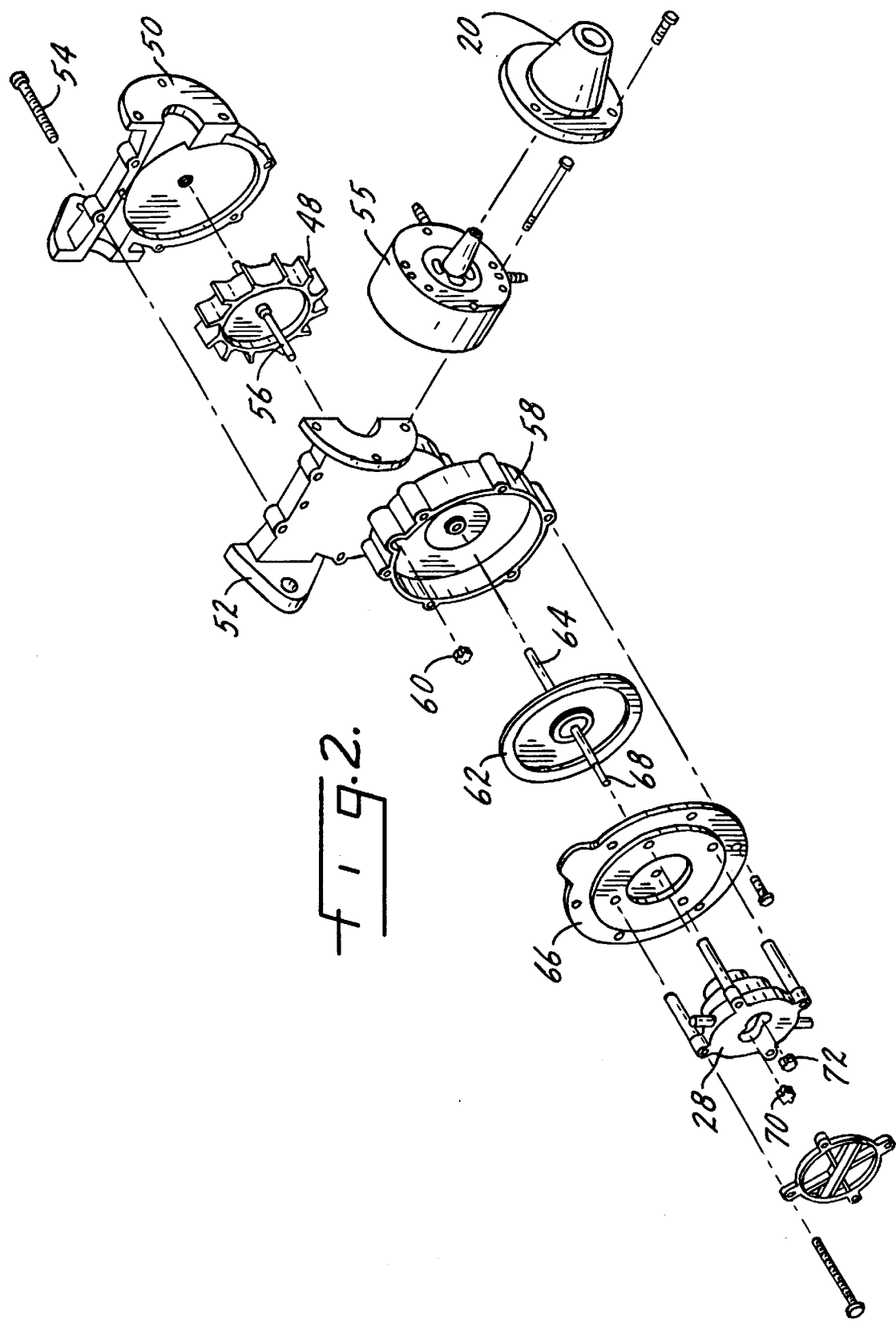

COMBINATION AEROSOL GENERATOR AND THERMAL FOGGER

THE FIELD OF THE INVENTION

The present invention relates to insecticide dispensing machines and more specifically such machines which may provide both an atomizing mist and a thermal fog. Such machines may be relatively small, for example hand-held, or they may be larger and mounted on some form of movable platform. In the past there have been machines which provide both an ultra-low volume atomizing discharge and a thermal fog. There were problems in such machines in drawing fluid from the formulation tank to both the thermal fogger and the atomizing nozzle. If the machine includes only an atomizing nozzle, it is possible to use air suction to draw fluid from the formulation tank. However, with a machine having dual capability, the atomizing nozzle would not normally draw fluid when the thermal fogger was operated and it was proposed to apply external pressure to the formulation tank. This was neither safe nor practical, as the type of pressure required could well burst the tank which would result not only in damage to the machine, but could also potentially injure the operator.

The present invention provides a solution to the problem of drawing fluid from the formulation tank by the use of a turbine wheel which is driven by the air pump supplying the atomizing nozzle. The turbine wheel in turn drives a fluid pump through a gear reduction mechanism, with the fluid pump pulling the solution from the formulation tank. The combination thermal fogger and ultra-low volume aerosol generator has a flow control valve to determine volume and a flow selector valve which determines whether the machine discharges either an aerosol mist or a thermal fog.

SUMMARY OF THE INVENTION

The present invention relates to a machine for dispensing insecticides for controlling mosquitos and more specifically to a machine which can provide either an aerosol discharge or a thermal fog discharge.

A primary purpose of the invention is to provide a dual discharge machine of the type described which utilizes a rotatable turbine wheel, in the path of air flow to the atomizing nozzle, to drive a pump which draws fluid from the formulation tank for use at either the atomizing nozzle or the thermal fogger.

Another purpose of the invention is to provide a simply constructed, reliable, dual purpose insecticide discharge machine of the type described which uses pressure from the atomizing air pump to draw insecticide from the formulation tank.

Another purpose is a machine of the type described which includes a flow control for regulating the volume of insecticide and a flow selector valve which alternately directs the formulation to either the atomizing nozzle or the thermal fogger.

Other purposes will appear in the ensuing specification, drawings and claims.

BRIEF DESCRIPTION OF THE DRAWINGS

The invention is illustrated diagrammatically in the following drawings wherein:

FIG. 2 is an exploded perspective of the atomizing nozzle, turbine pump and the connection therefrom to the fluid pump.

DESCRIPTION OF THE PREFERRED EMBODIMENT

Figure 1:
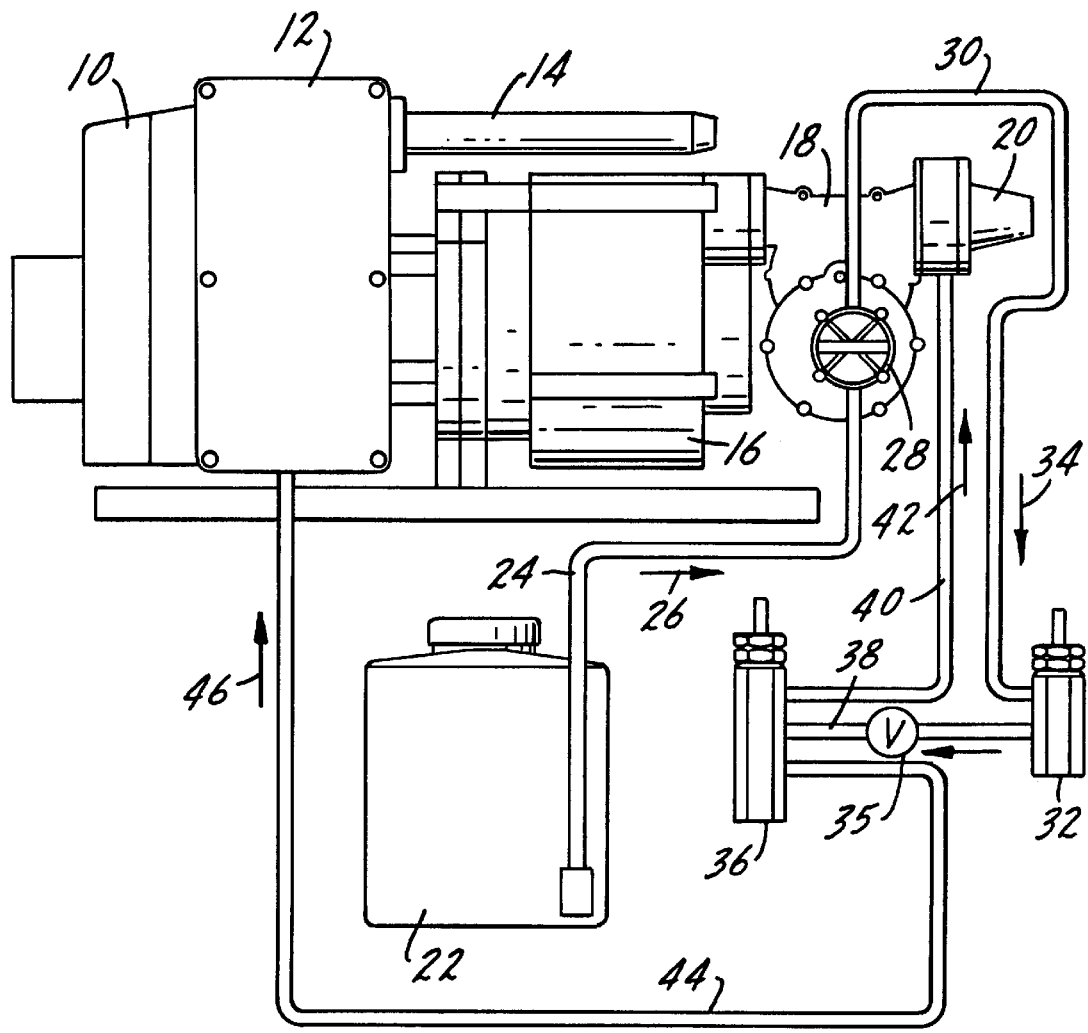
FIG. 1 is a diagrammatic illustration of a dual discharge insecticide dispensing machine of the type described.

Dual discharge insecticide dispensing machines are known in the art and one such machine has been sold by Clarke Engineering Technologies, Inc., the assignee of the present application, under the trademark TERRIER. Such a machine provides either an ultra-low volume aerosol discharge or a thermal fog discharge. There have been difficulties in such machines, however, with providing adequate flow rate to draw fluid from the formulation tank to both the atomizing nozzle and the thermal fogger. One solution which has not proved practical was to apply external pressure to the plastic formulation tank. This had the obvious disadvantage of possible tank destruction, as well as potential injury to the operator. The present invention provides a solution to drawing fluid from the formulation tank and does so by utilizing the flow of air which normally passes to the atomizing nozzle.

In FIG. 1 the engine of the unit is indicated at 10 and may for example be a 2 H.P. gasoline driven engine. Directly associated with the engine is the thermal fog muffler which is indicated at 12 and has extending outwardly therefrom a fog discharge tube 14. An air pump 16 is connected by a centrifugal clutch to the engine 10, with the air pump having an air output to a turbine pump indicated at 18 and shown in more detail in FIG. 2.

The turbine pump 18 is directly attached to an atomizing nozzle 20 which, along with the fog discharge tube 14, provide the alternate insecticide discharge means for the machine described herein.

A formulation tank is indicated at 22 and may for example contain a suitable insecticide in liquid form. The insecticide will be drawn from the tank 22 through a conduit 24 in the direction of arrow 26 to a chemical pump indicated at 28. As will be described hereinafter, the pump 28 is driven by the rotating wheel within the turbine pump 18.

From the fluid pump 28 the liquid insecticide will be drawn through a conduit 30 to a flow control valve 32, with fluid flowing in the direction of arrow 34. The flow control valve 32 may be used by the operator to manually control the volume of fluid passing to a pressure responsive on/off valve 35. This valve will not open until air pressure reaches a predetermined level suitable to properly atomize. Valve 35 is connected to a flow selector valve 36. A conduit 38 makes this connection. The flow selector valve is effective to provide the insecticide formulation to either the atomizing nozzle, through a conduit 40, with fluid flowing in the direction of arrow 42, or through a conduit 44 to the thermal fogger 12, with fluid flowing in the direction of arrow 46.

The machine shown in FIG. 1 may be a hand-held machine or it may be a larger volume machine which may be mounted on a suitable movable platform. The present invention is more directly concerned with the hand-held machine and the specific concern of providing adequate suction or pressure to move fluid from the formulation tank to either the atomizing nozzle 20 or the fog discharge tube 14 as controlled by the flow control valve 32 and the flow selection valve 36.

FIG. 2 illustrates the turbine pump and its connection to the chemical pump. The turbine pump 18 includes a turbine wheel 48 which is positioned within a turbine casing formed of a casing section 50 and a casing section 52, the two being held together by a plurality of bolts, one of which is indicated at 54. Rotation of the wheel 48 is brought about by air from the air pump 16 which passes from the air pump, around the turbine wheel 48, and through a housing 54 forming a part of the atomizing nozzle 20. The turbine wheel 48 has a shaft 56 which turns a pinion gear 60. The pinion gear 60 is in mesh with a large gear 62 mounted on a shaft 64 which extends between gear case portion 58 and a gear case cover 66. The gear 62 rotates a shaft 68 which extends through the gear case cover 66 to gears 70 and 72 of the chemical pump 28.

Thus, the air flowing from the air pump 16 to the atomizing nozzle provides the power to move the turbine wheel 48, with the turbine wheel, through the shaft 56 and the gear reduction of pinion gear 60 and large gear 62 being effective to drive the chemical pump 28. The pump 28 then draws formulation from the tank 22 to the flow control and flow selector valves for selective operation of either the atomizing nozzle to provide an ultra-low volume aerosol discharge or to the thermal fog discharge 14 to provide an insecticide fog.

Whereas the preferred form of the invention has been shown and described herein, it should be realized that there may be many modifications, substitutions and alterations thereto.

The embodiments of the invention in which an exclusive property or privilege is claimed are defined as follows:

1. A combination ultra-low volume aerosol generator and thermal fogger for dispensing an insecticide for use against mosquitos, including a power source, an air pump connected to and driven by said power source, a turbine pump connected to said air pump and having a rotatable turbine wheel driven by air from said air pump, a fluid pump connected to and driven by rotation of said turbine wheel, an insecticide formulation tank, a fluid conduit between said tank and an input of said fluid pump, an atomizing nozzle connected to said air pump, a fluid conduit between an output of said fluid pump and said atomizing nozzle to provide liquid insecticide to said nozzle for dispensing thereof in an atomized form, a thermal fog muffler connected to and driven by said power source, a fluid conduit between said fluid pump output and said muffler to provide liquid insecticide to said muffler, a fog discharge tube connected to said muffler to provide an insecticide discharge fog.

2. The combination of claim 1 wherein said power source is a gasoline engine.

3. The combination of claim 1 in which said turbine wheel drives a rotatable shaft, the rotation of which drives said fluid pump, and gear means connecting said turbine wheel shaft and said fluid pump.

4. The combination of claim 3 wherein said turbine wheel is directly in the path of air flow between said air pump and said atomizing nozzle.

5. The combination of claim 4 wherein said turbine pump includes a turbine casing, with said casing being directly connected to said atomizing nozzle and said air pump.

6. The combination of claim 1 including a flow selector valve, a fluid conduit between said fluid pump and said flow selector valve, said flow selector valve having two outputs, a fluid conduit between one of said outputs and said thermal fog muffler, and a fluid conduit between the other output and said atomizing nozzle whereby said flow selector valve controls the flow of fluid from said formulation tank to said atomizing nozzle and said fog discharge tube.

7. The combination of claim 6 including a flow control valve connected in the fluid conduit between said fluid pump and said flow selector valve, said flow control valve determining the volume of fluid flowing from said formulation tank, through said fluid pump, to said flow selector valve.

* * * * *